Patented May 28, 1935

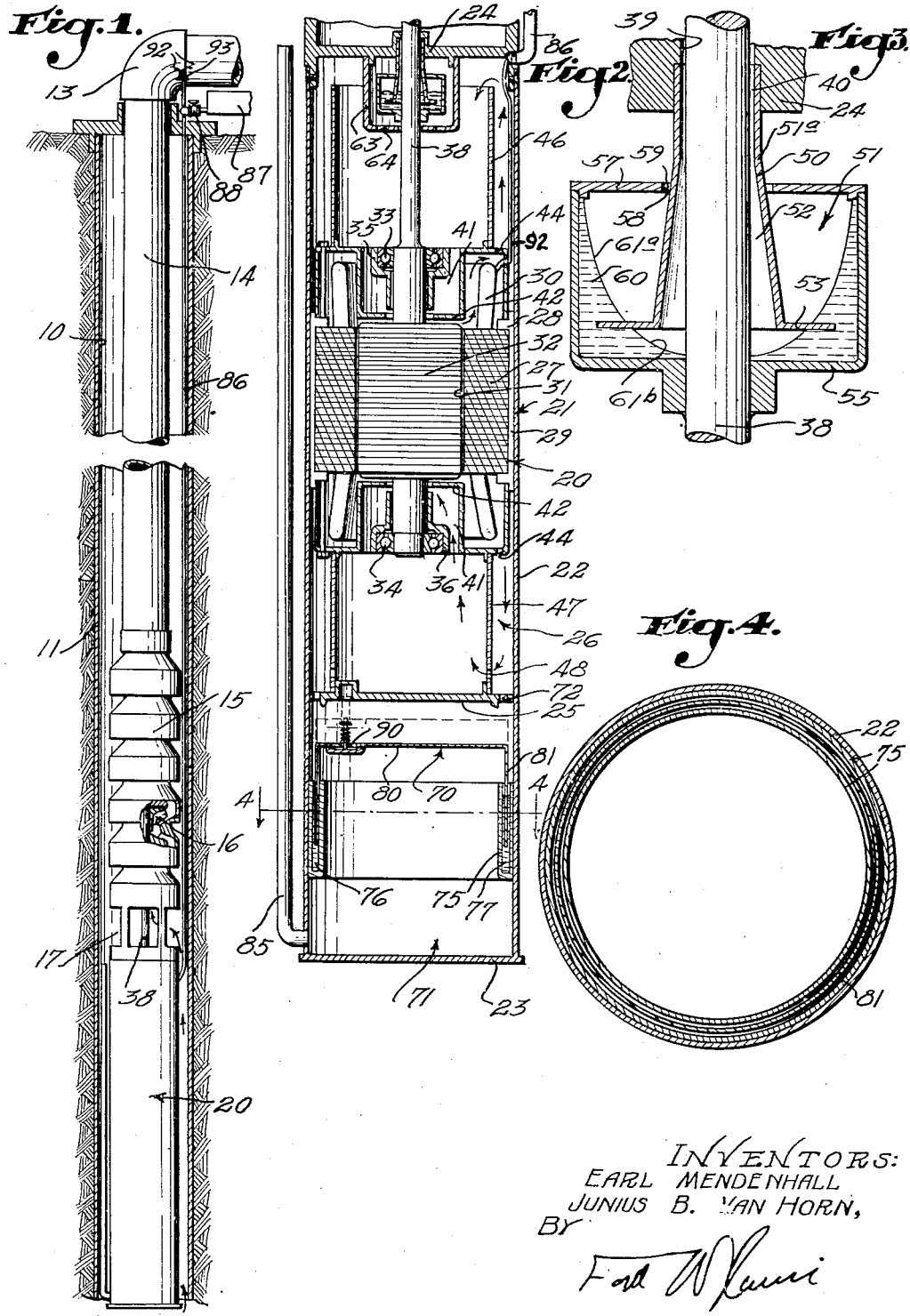

2,002,911

UNITED STATES PATENT OFFICE 2,002,911

INVERTED MOTOR FOR PUMPS

Earl Mendenhall and Junius B. Van Horn, Los Angeles, Calif., assignors to Menhorn, Inc., Los Angeles, Calif., a corporation of California Application January 9, 1928, Serial No. 245,307

6 Claims. (Cl. 103—87)

Our invention relates to submersible structures such as submersible motors, and more particularly to a motor which may be operated submerged in a fluid which might be injurious to the motor should it enter therein.

In describing the motor of our invention, we shall refer particularly to the deep-well pumping art for purposes of illustration without limiting ourselves thereto, inasmuch as the motor and other details of our invention may be advantageously utilized in various other arts.

In pumping wells not exceeding several hundred feet in depth, it is customary to install a turbine pump in the well, the impellers in this pump being operated by means of a motor situated in a pump head at the surface of the ground. It is necessary to journal the shaft connecting the motor and the impellers at frequent intervals throughout its length. Many problems arise in using such an installation, among which are very large frictional forces developed, undue wear, difficult lubrication, danger of breakage of the shaft, etc.

Wells up to several thousand feet in depth are usually pumped by a reciprocating pump rather than a turbine pump. In these deeper wells, the pump is suitably held below the surface of the fluid in the well, and the plunger of the pump is reciprocated by means of a string of sucker rods extending upward to the surface of the ground. These sucker rods are subject to the same, and even more numerous, disadvantages as is the shaft of the turbine pump. The use of either type of pump installation is uneconomical but is made necessary inasmuch as no motor has been produced which will successfully operate submerged for long periods of time without attention. We have invented a motor which may be directly connected to the pump unit and lowered therewith beneath the surface of the fluid to be pumped.

It is an object of our invention to provide a motor which will successfully operate submerged in a fluid which might be injurious to the motor should it enter therein.

We have found it particularly advantageous to secure the motor to the lower end of the pump unit, inasmuch as the fluid pumped is then drawn upward around the exterior of the motor, thus cooling the motor and increasing the amount of power derivable therefrom without overloading the motor.

It is an object of our invention to provide a pumping unit comprising a pump operated by a motor directly connected to the lower end of the pump, this pumping unit being adapted to be submerged below the fluid to be pumped.

In designing our submersible motor, we have found it advantageous to use a motor filled with a neutral fluid which is non-injurious to the working parts of the motor. We have furthermore found it advantageous to equalize the pressures of this neutral fluid and the external fluid in which the motor is submerged.

It is an object of our invention to provide a motor operating in a shell adapted to be filled with a neutral fluid, this neutral fluid being at a pressure substantially equal to the pressure of the external fluid in which the motor is submerged.

We have designed a fluid-packed seal at the junction of the shaft and the motor shell, this fluid-packed seal containing a high density fluid separating the neutral and external fluids.

It is an object of our invention to provide a motor having a fluid-packed seal separating the neutral and the external fluids.

In effecting this equalization of pressures, we provide a separating member, this member being movable with its edges submerged in a body of sealing fluid, this sealing fluid being mercury or other high density fluid.

It is an object of our invention to provide a fluid-packed pressure-equalizing separating member which prevents entry of the external fluid into the submersible structure.

Our motor may be adapted to receive neutral fluid through a pipe communicating with the interior thereof and extending upward above the surface of the external fluid.

It is an object of our invention to provide a submersible motor having a pipe extending upward above the surface of the fluid in which the motor is submerged, this pipe being adapted to supply a neutral fluid to the interior of the motor.

Further objects and advantages of our invention will be made evident hereinafter.

Referring to the drawing,—

Fig. 1 is a utility view showing our motor attached to a suitable turbine pump.

Fig. 2 is a vertical cross-sectional view of the motor of our invention.

Fig. 3 is an enlarged view of a fluid-packed seal of our invention when the motor is in operation.

Fig. 4 is a horizontal sectional view taken on the line 4—4 of Fig. 2.

Fig. 1 illustrates a well 10 in which a well casing 11 has been set. Extending downward from an elbow 13 at the surface of the ground is a discharge pipe 14. Secured to the lower end of this discharge pipe is a turbine pump unit 15 having impellers 16 therein, these impellers drawing fluid through ports 17 formed in a suitable chamber-defining frame extending downward from the lowermost bowl of the pump unit and through the intake passages of the pump, this fluid being forced upward in the discharge pipe 14 to the surface of the ground. The impellers 16 are adapted to be rotated by means of a motor 20 of our invention, this motor being secured to the lower end of the pump 15.

The details of our motor 20 may be best understood by referring to Figs. 2, 3, and 4. The motor 20 provides a shell 21 which encloses the working parts thereof. The shell 21 comprises a cylindrical side wall 22 closed at its lower end by a lower wall 23 and at its upper end by an upper wall 24.

An intermediate wall 25 defines the lower limit of an upper or motor chamber 26 formed in the upper part of the shell 21. Suitably secured in the motor chamber 26 is a stator 27, this stator being mounted in a sleeve 28 having openings 29 extending longitudinally thereof. A suitable winding 30 is placed on the stator 27. Adapted to operate in an opening 31 of the stator 27 is a rotor 32, this rotor being suitably journalled by upper and lower bearings 33 and 34 secured respectively in upper and lower bearing members 35 and 36. A shaft 38 is rigidly secured to the rotor 32, this shaft extending through an opening 39 in the upper wall 24 so as to allow a clearance space 40 therebetween. The upper end of the shaft is rigidly connected to each impeller 16 of the turbine pump 15.

The upper and lower bearing members 35 and 36 have channels 41 therein, these channels opening on the rotor 32 at a point adjacent the ends thereof and near the shaft 38. An inner wall 42 of each channel 41 extends close to the ends of the rotor 32. In operation, the motor chamber 26 is adapted to be filled with a neutral or internal fluid which is non-injurious to the working parts of the motor, this fluid having high dielectric properties, low viscosity, and good lubricating qualities. When the rotor 32 is turning, the neutral fluid between the inner walls 42 and the ends of the rotor 32 is thrown outward, due to centrifugal action and skin friction on the end of the rotor. The path followed by this fluid is as indicated by the arrows in Fig. 2, this fluid passing through openings 44 in the bearing members 35 and 36, and flowing along the outside of upper and lower baffle members 46 and 47. The fluid returns to the channels 41 over the top of the upper baffle 46, and through openings 48 in the lower baffle 47. These baffles are for the purpose of guiding the fluid adjacent the side wall 22 of the shell 21. Inasmuch as the fluid pumped by the pump 15 is rising around the motor 20, this side wall 22 is always kept cool, and any heat developed by the motor is transferred through the side wall 22 to the fluid being pumped.

Extending downward from the opening 39 in the upper wall 24 is an apron 50 of a fluid-packed seal 51 of our invention. The lower end of the apron 50 diverges as indicated at 51ª, there being a space 52 between the apron and the shaft 38, this space being in communication with the clearance space 40. The lower end of the apron 50 is formed in the shape of a radial plate 53.

Secured to the shaft 38 is a cup portion 55 which is adapted to enclose the portions 51ª and 53 of the apron 50. A cover plate 57 closes the upper end of the cup 55 and has an opening 58 therein. The apron 50 extends through the opening 58, leaving a clearance space 59 therebetween. A body of mercury 60, or other high density fluid which is relatively immiscible with the neutral fluid and the external fluid being pumped, is poured into the cup 55 until the upper level thereof rises above the radial plate 53. The apron 50 divides this upper surface into an outer surface 61ª and an inner surface 61ᵇ. When in operation, the neutral fluid has access to the clearance space 59 and thus fills that portion of the cup 55 outside of the apron 50, thus directly contacting the outer surface 61ª. Similarly, the external fluid surrounding the motor has access through the ports 17 with the clearance space 40 so that this external fluid fills the space 52 between the apron 50 and the shaft 38 and contacts the inner surface 61ᵇ of the mercury 60. When the shaft 38 is turning, the mercury is thrown outward into a shape substantially as shown in Fig. 3. The apron 50 is, however, so designed that the outer edges of the radial plate 53 are at all times below the surface of the mercury 60.

A cage 63 having openings 64 therein provides a seal chamber for the fluid-packed seal 51 and is secured to the upper wall 24. This cage 63 prevents the neutral fluid in the upper portion of the motor chamber from being unduly agitated as the cup 55 is rotated.

In using a fluid-packed seal such as the one indicated in the drawing, it is highly desirable that the pressures of the neutral fluid and the external fluid be equalized in order that the mercury 60 is not displaced sufficiently to allow fluid to escape around the outer edges of the radial plate 53 and bubble through the mercury. In accomplishing this result, we provide a pressure-equalizing means 70 operating in a balance chamber 71 defined in the cylindrical side wall 22 between the intermediate plate 25 and the lower wall 23, the balance chamber being in communication with the motor chamber 26 through openings 72 in the intermediate wall 25. Secured to the interior of the cylindrical side wall 22 in the balance chamber 71 is a circular member 75 which is U-shaped in vertical cross-section so as to form a sealing-fluid channel 76 extending around the shell 21. This sealing-fluid channel is adapted to be substantially filled with suitable sealing fluid indicated by the numeral 77. This sealing fluid may be mercury or other high density fluid which is relatively immiscible with the neutral and external fluids. A separating member 80 has cylindrical side members 81 extending downward, these side members being adapted to extend below the surface of the sealing fluid 77 as indicated in Fig. 2. That portion of the balance chamber 71 above the separating member 80 is adapted to be filled with neutral fluid, while that portion of the balance chamber 71 below the separating member is filled with external fluid entering therein through a filling pipe 85 extending upward to a point slightly above the upper wall 24 outside the shell 21, this pipe thus terminating near the level at which the seal is positioned.

The motor of our invention may be operated either with or without a neutral-fluid supply pipe 86 communicating with the upper end of the motor chamber 26 and extending upward to a point above the surface of the external fluid. In the drawing, this pipe is shown as extending upward to the surface of the ground. The neutral-fluid supply pipe 86 is adapted to supply neutral fluid to the motor chamber, this fluid being stored in a suitable storage tank 87 at the surface of the ground, the flow therefrom being controlled by a valve 88.

Inasmuch as the pressures of the neutral fluid and the external fluid are always equalized by the separating member 80, it follows that the neutral fluid will stand at a level in the pipe 86 which is substantially the same as the level of the external fluid in the well, any difference in these levels being due to a difference in density between the two fluids. Should the pressure of the external fluid increase, the separating member 80 will be moved upward slightly. The cross-sectional area of the balance chamber 71 is sufficiently larger than the cross-sectional area of the interior of the pipe 85 so that a very small movement of the separating member 80 will cause a large change in level of the neutral fluid in the pipe 86. Thus the level of fluid in the pipe 86 and the level of the external fluid will be maintained substantially the same by a very slight movement of the separating member 80 in response to any difference of pressure existing between the two fluids. As additional neutral fluid is supplied to the pipe 86 this fluid will cause the separating member 80 to move downward slightly. Should this downward movement be great enough, the separating member will reach a lower position where the side members 81 will contact the bottom of the sealing-fluid channel 76. Should more neutral fluid be supplied to the pipe 86, the separating member would become inoperative to equalize the pressures between the neutral and external fluid and the pressure of the neutral fluid would rise above that of the external fluid. This would cause a displacement of the bodies of mercury 60 and 77.

To prevent an excessive displacement of this mercury, a spring actuated valve 90 is placed in the separating member 80 to release this excess of pressure by allowing a small portion of the neutral fluid to escape therethrough into the external fluid in the balance chamber 71.

The neutral-fluid supply pipe 86 also serves as a convenient means of supplying electrical energy to the motor. As shown in Fig. 2, leads 92 are attached to the stator winding 30, these leads rising through the pipe 86 and leaving the upper end thereof through an insulator 93.

The operation of our invention is as follows:

Before the motor is lowered into the well, neutral fluid is poured therein until the motor chamber 26 is filled therewith. It is possible in thus filling the motor shell to continue pouring neutral fluid into the shell 21 until this fluid rises in the filling pipe 85 to a point near the top thereof; or it is also possible to pour a portion of external fluid into the filling pipe 85 to fill the lower portion of the balance chamber 71 below the separating member 80. The filling pipe 85 prevents any of the fluid in the shell 21 from escaping therefrom as the motor is lowered in the well. As soon as the upper end of the filling pipe is submerged, the pressure in the lower portion of the balance chamber will increase and the separating member 80 will rise sufficiently to force neutral fluid upward in the pipe 86 to the same level as the level of the external fluid in the well, as previously described. It is possible to lower the motor 20 into its lowermost position without adding more neutral fluid to the pipe 86 provided the balance chamber 71 is made sufficiently large. It is also possible to supply neutral fluid to the pipe 86 as the motor is being lowered. In normal operation, we prefer to maintain the separating member 80 near its lowermost position so as to allow plenty of vertical movement of the separating member to compensate for any increase in external fluid pressure.

It will be clear that by positioning the pump intake above the motor, the level of the well liquid will never be drawn below the motor. Thus, the motor will be constantly surrounded by the well liquid so as to always be cooled thereby, and the neutral fluid will never drain completely from the motor even if the filling pipe 85 is not used. Furthermore, it will be clear that the pressure of the well liquid is transmitted to the balance chamber through the pipe 85, and it is very desirable to use the pipe positioned as shown so that variations in the intake pressure of the pump, and which directly reach one portion of the seal, are transmitted to the interior of the shell so that the pressure of the neutral fluid will also vary and proportionately vary the pressure on the other portion of the seal.

We claim as our invention:

1. In a submersible motor, the combination of: walls forming a motor chamber substantially filled with a neutral fluid; a stator in said motor chamber; a rotor adapted to rotate relative to said stator; a shaft on said rotor, said shaft extending through an upper wall of said motor chamber, walls forming a balance chamber in communication with said motor chamber and with the external fluid in which said motor is submerged; and a separating member separating bodies of said neutral and said external fluid in said balance chamber, the edges of said separating member being below the surface of a fluid-seal between said neutral and said external fluid.

2. In a submersible motor, the combination of: walls forming a motor chamber substantially filled with a neutral fluid; a stator in said motor chamber; a rotor adapted to rotate relative to said stator; a shaft on said rotor, said shaft extending through an upper wall of said motor chamber; walls forming a balance chamber in communication with said motor chamber; walls forming a sealing-fluid channel in said balance chamber; and a separating member having edges extending below the sealing-fluid in said channel.

3. In a submersible motor, the combination of: walls forming a motor chamber substantially filled with a neutral fluid; a stator in said motor chamber; a rotor adapted to rotate relative to said stator; a shaft on said rotor, said shaft extending through an upper wall of said motor chamber; walls forming a balance chamber in communication with said motor chamber; walls forming a sealing-fluid channel in said balance chamber; a separating member having edges extending below the sealing-fluid in said channel; and a neutral-fluid pipe communicating with said motor chamber and extending to a point above the surface of said external fluid.

4. In a submersible motor-pump unit adapted for use in pumping a well, the combination of: a centrifugal pump unit providing an inlet means; a motor shell positioned directly below said pump unit, there being a chamber formed between said centrifugal pump unit and said motor shell in which chamber the pressure is substantially the intake pressure of said pump; a motor means in the upper portion of said motor shell, said motor shell containing an internal liquid; a rotatable connecting means extending upward through said motor shell and operatively connecting said pump unit and said motor means; a sealing means at the junction of said connecting means and said motor shell for sealing the internal liquid from the external liquid in which said motor-pump unit is submerged, the outer portion of said sealing means communicating with said chamber and the inner portion of said sealing means communicating with said internal liquid; walls forming a passage communicating with said external liquid at a level near said sealing means and thus being affected by changes of intake pressure of said pump unit, said passage communicating with the lower portion of said motor shell whereby said lower portion of said shell defines a balance chamber containing pressure-equalized bodies of said internal and external liquids whereby pressure variations in said intake pressure of said pump unit are transmitted to the internal liquid and thence to the inner portion of said seal.

5. In a submersible structure, the combination of: walls submerged in an external liquid and defining an upper chamber; a shaft extending upward from said upper chamber; a sealing means for sealing the junction of said shaft and said walls; walls forming a balance chamber below said upper chamber and communicating therewith, said balance chamber communicating with said external liquid and containing a body thereof; walls forming an annular sealing-fluid channel in said balance chamber and containing a sealing fluid; and a member extending across said balance chamber, the edges of said member extending into said sealing fluid to prevent any of said external liquid from reaching said upper chamber.

6. In a submersible motor-pump unit adapted for use in pumping a well, the combination of: a pump positioned in said well beneath the surface of the well liquid; a motor shell positioned below said pump but spaced therefrom to define a chamber communicating with the intake of said pump to conduct well liquid to the intake of said pump; a motor in said motor shell; connecting means operatively connecting said pump and said motor and extending through said chamber; a seal at the junction of said connecting means and said motor shell, an outer portion of said seal communicating with said chamber and an inner portion thereof communicating with the interior of said motor shell; and means for maintaining the pressure inside said motor shell substantially the same as the intake pressure of said pump, said means including a passage in open communication at one end with the lower part of said motor shell and at the other end with the well liquid drawn into said chamber by said pump, said passage opening on the pumped well liquid at a level near the top said motor shell.

EARL MENDENHALL.
JUNIUS B. VAN HORN.

CERTIFICATE OF CORRECTION.

Patent No. 2,002,911.  May 28, 1935.

EARL MENDENHALL, ET AL.

It is hereby certified that error appears in the printed specification of the above numbered patent requiring correction as follows: Page 4, second column, line 14, claim 6, for "pcmp" read pump; and line 32, for "faid" read of said; and that the said Letters Patent should be read with these corrections therein that the same may conform to the record of the case in the Patent Office.

Signed and sealed this 9th day of July, A. D. 1935.

Bryan M. Battey (Seal)  Acting Commissioner of Patents.